Patented Apr. 30, 1935

1,999,257

UNITED STATES PATENT OFFICE 1,999,257

PROCESS FOR THE CONTINUOUS MANUFACTURE OF AMMONIUM SALTS

Arthur Ferdinand August Reynhart, Velsen-Noord, Netherlands, assignor to Naamlooze Vennootschap de Bataafsche Petroleum Maatschappij, The Hague, Netherlands No Drawing. Application February 12, 1931, Serial No. 515,420. In the Netherlands February 24, 1930

3 Claims. (Cl. 23—119)

My invention relates to a process for the continuous manufacture of ammonium salts from ammonia and acids.

The object of the invention is to arrange the method of manufacturing ammonium salts, for instance sulphate, nitrate, phosphate, chloride, etc., in such a way that the colour of the product is completely under control.

It is known that the ammonium sulphate, manufactured for instance, from synthetic ammonia and technical sulphuric acid has a yellow or cream colour. Absolutely white ammonium sulphate has been obtained so far, for instance, by a double conversion of a suspension of gypsum with a solution of ammonium carbonate, the mass being then filtered, after which pure white ammonium sulphate is obtained from the solution by evaporation.

From investigations it has been found that the impure colour of the salts manufactured from ammonia and acids must be principally ascribed to the presence of iron and small quantities of arsenic due to impurities in the acid used. Concentrations of 0.02% iron in the salt have already a very noticeable effect on the colour of the salt.

It has now been found that in the continuous manufacture of ammonium salts from ammonia and acids a white or practically white salt can be obtained by neutralizing the whole or part of the acid liquid used and removing the precipitate formed thereby, after which the filtered liquid can again be used in the continuous manufacture.

A practical embodiment of the process is as follows:

Sulphuric acid of the desired concentration, e. g. 8 to 10%, is put in a saturator. Ammonia is then continuously admixed with the sulphuric acid, the solid ammonium sulphate forming being run off from the saturator by means of an ejector, and then freed of the greater part of the acid liquid, first in collecting tanks and afterwards in centrifuges. The mother lye thereby obtained is returned to the saturator. The moist salt is subsequently dried with hot air and neutralized with ammonia.

It is clear that the concentration of the colouring components, in this case Fe and As, becomes continually greater in the saturator, so that at a given moment it becomes so large that the colour of the sulphate no longer comes up to the requirements. The contents of the saturator are then entirely neutralized with ammonia, and filtered, as a result of which the Fe and As present are removed. The filtered liquid is then again suitable for use in the saturator. This can be brought about by siphoning over the liquid from the saturator into a tank in which, after water has been added, if necessary, to prevent crystallization, neutralization is carried out with a small excess of $NH_3$, after which the neutralized liquid is filtered and returned to the saturator. The moment at which the neutralization and filtration of the contents of the saturator is carried out, depends of course on the purity of the sulphuric acid, whereby it may also be necessary to take into account the possibility that the sulphuric acid may contain impurities through corrosion of some parts of the apparatus. Further the moment at which the neutralization takes place depends on the requirements made of the colour of the salt, and on various working conditions.

Another embodiment of the process according to my invention consists in a part of the liquid in the saturator being continuously drawn off, neutralized and, after the precipitate has been removed, returned to the saturator.

It is also possible according to the invention to keep the content of those components of the acid that are injurious to the colour of the ammonium salts at the desired low level by wholly or partly, continuously or periodically neutralizing the mother lye obtained from the separation of the crystals, before this is returned to the saturator, and removing the precipitate. It is therefore possible to collect, for instance, the mother lye of the centrifuges, or if filters are used, the filtrate, either continuously or periodically in a tank and, if necessary after being diluted with water, neutralize it with ammonia and filter it, after which the filtrate is returned to the saturator.

In the same way it is possible to treat the the liquid coming from the dripping racks, accumulating tanks and any other vessels between the saturator and the centrifuge (filter).

What I claim is:

1. In the process of making ammonium sulfate by passing ammonia into a bath of sulfuric acid normally containing as impurity iron, and removing solid ammonium sulfate from said bath, that improvement in producing said ammonium sulfate free from discoloration which comprises withdrawing and treating at least a portion of said acid bath with ammonia to neutralize the acid and to precipitate the coloring contaminants, removing from the resulting neutralized liquor the precipitate formed, and returning the neutralized liquor to the acid bath.

2. In a process of making ammonium sulfate by passing ammonia into a bath of sulfuric acid normally containing discolorants, that improvement in producing said ammonium sulfate free from discoloration which comprises withdrawing and treating at least a portion of said acid with ammonia to neutralize the acid and to precipitate the discolorants, removing the precipitate formed and returning the neutralized liquor to the acid bath.

3. In the process of making ammonium sulfate by passing ammonia into a bath of sulfuric acid normally containing as impurity arsenic and removing solid ammonium sulfate from said bath, that improvement in producing said ammonium sulfate free from discoloration which comprises withdrawing and treating at least a portion of said acid bath with ammonia to neutralize the acid and to precipitate the coloring contaminants, removing from the resulting neutralized liquor the precipitate formed, and returning the neutralized liquor to the acid bath.

ARTHUR FERDINAND AUGUST REYNHART.